US012661992B2

(12) United States Patent
Wesenauer et al.

(10) Patent No.: US 12,661,992 B2
(45) Date of Patent: Jun. 23, 2026

(54) POWER DELIVERY CONTROL SYSTEM FOR AN ELECTRIC VEHICLE AND DIAGNOSTIC METHOD THEREFOR

(71) Applicant: BRP-ROTAX GMBH & CO. KG, Gunskirchen (AT)

(72) Inventors: Severin Wesenauer, Attnang-Puchheim (AT); Simon Wolfsegger, Roitham am Traunfall (AT); Florian Hoessle, Steinhaus bei Wels (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 377 days.

(21) Appl. No.: 18/263,165

(22) PCT Filed: Jan. 28, 2022

(86) PCT No.: PCT/EP2022/052074
§ 371 (c)(1),
(2) Date: Jul. 27, 2023

(87) PCT Pub. No.: WO2022/162159
PCT Pub. Date: Aug. 4, 2022

(65) Prior Publication Data
US 2024/0083253 A1 Mar. 14, 2024

Related U.S. Application Data

(60) Provisional application No. 63/143,466, filed on Jan. 29, 2021.

(51) Int. Cl.
*B60L 3/04* (2006.01)
*B60L 3/00* (2019.01)
*B60L 50/60* (2019.01)

(52) U.S. Cl.
CPC ............... *B60L 3/04* (2013.01); *B60L 3/0046* (2013.01); *B60L 50/60* (2019.02); *B60L 2240/547* (2013.01); *B60L 2270/20* (2013.01)

(58) Field of Classification Search
CPC .......... B60L 3/04; B60L 50/60; B60L 3/0046; B60L 2240/547; B60L 2270/20
See application file for complete search history.

(56) References Cited

U.S. PATENT DOCUMENTS 6,295,215 B1 * 9/2001 Faria ....................... H02J 9/062
363/124
6,459,175 B1 * 10/2002 Potega .................... B60L 53/11
307/132 M (Continued)

FOREIGN PATENT DOCUMENTS

JP 2020202646 A 12/2020

OTHER PUBLICATIONS

International Search Report of PCT/EP2022/052074 isssued from ISA/EP; Tilman Utz; Apr. 28, 2022.

*Primary Examiner* — Gertrude Arthur Jeanglaude
(74) *Attorney, Agent, or Firm* — BCF LLP

(57) ABSTRACT

A command for a start procedure initiates a diagnostic sequence for an electric system (1) including a power stage (20) of a vehicle. A first switched current-limiting path (150) between a first polarity (12) of a battery (10) and a first polarity of the power stage (20) is closed. If an output voltage applied on the power stage is less than a low voltage threshold (320), the first switched current-limiting path (150) is opened and a second switched current-limiting path (170) between a second polarity (14) of the battery (10) and a second polarity of the power stage (20) is closed. If the output voltage is still less than the low voltage threshold (340), the first switched current-limiting path (150) is closed again (350). If the output voltage increases to meet or exceed (Continued)

an operating voltage threshold, a first switched non-current-limiting path (125) parallel to the first current-limiting path (150) and a second switched non-current-limiting path (130) parallel to the second current-limiting path (170) are both closed.

20 Claims, 6 Drawing Sheets

(56)                    References Cited

U.S. PATENT DOCUMENTS

| 8,901,934 | B2 | | 12/2014 | Namou et al. | |
|---|---|---|---|---|---|
| 9,260,015 | B2 | | 2/2016 | Gonzales et al. | |
| 10,992,164 | B2 | * | 4/2021 | Lebreux | H02J 7/0019 |
| 12,074,433 | B2 | * | 8/2024 | Lebreux | H02J 7/00 |
| 2008/0002322 | A1 | | 1/2008 | Hirasawa | |
| 2018/0272870 | A1 | | 9/2018 | Burkman et al. | |
| 2019/0319472 | A1 | | 10/2019 | Lebreux | |

* cited by examiner

400

Receive start command — 402

Measure $V_{out}$ — 404

$V_{out} \geq V_{er\_th}$ — 406

Yes

Close both switched non-current limiting paths — 408

Operate the electric system — 410

D

No

Close first switched current-limiting path — 412

Measure $V_{out}$ — 414

$V_{out} < V_{low\_th}$ — 416

Yes

Open first switched current-limiting path — 422

A

No

Open first switched current-limiting path — 418

Abort the start procedure — 420

POWER DELIVERY CONTROL SYSTEM FOR AN ELECTRIC VEHICLE AND DIAGNOSTIC METHOD THEREFOR

CROSS-REFERENCE

The present application claims priority from U.S. Provisional Patent Application Ser. No. 63/143,466, filed on Jan. 29, 2021, the disclosure of which is incorporated by reference herein in its entirety.

FIELD OF TECHNOLOGY

The present technology relates to a power delivery control system for an electric vehicle and to a diagnostic method therefor.

BACKGROUND

Electric vehicles, including hybrid vehicles, are becoming increasingly prevalent. Many of these vehicles comprise a large-capacity battery (or a number of battery cells effectively forming a battery), one or more electric motors operatively connected to a drivetrain, at least one power converter for adapting DC power from the battery to the specific needs of the electric motor(s), and a motor control module (MCM) controlling the power converter for driving the electric vehicle. A power converter may for example comprise an inverter controlled by the MCM for converting DC power from the battery to multiphase AC power delivered to an electric motor. The MCM controls the inverter for delivering an appropriate amount of power to the electric motor according, for example, to a position of an accelerator control of the vehicle.

A large capacitor (or a large capacitor bank) is integrally included in the inverter, in order to compensate for reactive currents occurring in the operation of the inverter.

Power contactors are provided between the battery and the load, the load comprising the inverter including the capacitor, and the electric motor. These power contactors are open when the vehicle is not in use, and closed when starting and operating the vehicle. Such power contactors are sturdy and are designed for withstanding the high voltage of the battery and the large current flowing between the battery and the load, for example under heavy acceleration of the vehicle. Output current levels delivered by the battery to the load may be high, sometimes over 100 amperes.

Despite care in the construction of the power contactors, these contactors may fail, especially when they have gone through a large number of opening and closing cycles. For example, the power contactors may fail when the current level is important for an extended period. In another example, the power contactors may fail when they open while the current level is important, as this action may cause arcing on the contactors. Arcing may also result from bouncing of the power contactors upon closing. As a result, some power contactors may experience unintended welding and remain closed when they should be open.

Some power contactors have been known to fail and remain closed (i.e. conductive) when they should open, for example at shutdown of the vehicle. This may be caused by welding of internal contacts within the power contactors due to the current passing through these components.

SUMMARY

It is an object of the present technology to ameliorate at least some of the inconveniences present in the prior art.

In a first aspect, the present technology provides a power delivery control system configured for selectively delivering power from a battery to a power stage of a vehicle, the power delivery control system comprising: a contactor module, comprising: a first switched non-current-limiting path connectable between a first polarity of the battery and a first polarity of the power stage of the vehicle, a first switched current-limiting path mounted in parallel with the first switched non-current-limiting path, a second switched non-current-limiting path connectable between a second polarity of the battery and a second polarity of the power stage of the vehicle, a second switched current-limiting path mounted in parallel with the second switched non-current-limiting path, a voltage sensor configured for measuring an output voltage of the contactor module between the first and second polarities of the power stage of the vehicle; and a motor control module operatively connected to the first and second switched non-current-limiting paths, to the first and second switched current-limiting paths, and to the voltage sensor, the motor control module being configured for: a) receiving a command for a start procedure, b) after a), selectively closing the first switched current-limiting path, c) after b), in response to a magnitude of the output voltage being less than a first voltage threshold, opening the first switched current-limiting path and closing the second switched current-limiting path, d) after c), in response to the magnitude of the output voltage being less than the first voltage threshold, closing the first switched current-limiting path, e) after d), in response to the magnitude of the output voltage increasing to meet or exceed a second voltage threshold greater than the first voltage threshold, closing the first and second switched non-current-limiting paths.

In some implementations of the present technology, the contactor module further comprises: a first input configured for being electrically connected to the first polarity of the battery; a second input configured for being electrically connected to the second polarity of the battery; a first output configured for being electrically connected to the first polarity of the power stage of the vehicle; and a second output configured for being electrically connected to the second polarity of the power stage of the vehicle; wherein: the first switched non-current limiting path and the first switched current limited path extend between the first input and the first output of the contactor module, the second switched non-current limiting path and the second switched current limited path extend between the second input and the second output of the contactor module, and the voltage sensor is configured for measuring the output voltage of the contactor module between the first and second outputs of the contactor module.

In some implementations of the present technology, the motor control module is further configured for: aborting the start procedure at operation c) or d) in response to the magnitude of the output voltage meeting or exceeding the first voltage threshold, and aborting the start procedure at operation e) in response to the magnitude of the output voltage failing to meet or exceed the second voltage threshold.

In some implementations of the present technology, each of the first switched current-limiting path, the second switched current-limiting path, the first switched non-current limiting path and the second switched non-current limiting path is normally open.

In some implementations of the present technology, the motor control module is further configured for opening each of the first switched current-limiting path, the second switched current-limiting path, the first switched non-current limiting path and the second switched non-current limiting path before receiving the command for the start procedure.

In some implementations of the present technology, the system further comprises: a capacitor connected to the first and second polarities of the power stage of the vehicle; wherein the first switched current-limiting path is a first pre-charge circuit for the capacitor; and wherein the second switched current-limiting path is a second pre-charge circuit for the capacitor.

In some implementations of the present technology, the first switched current-limiting path comprises a first switch connected in series with a first resistor; and the second switched current-limiting path comprises a second switch connected in series with a second resistor.

In some implementations of the present technology, the system further comprises: a first coil operatively connected to the first switch, the first coil being controlled by the motor control module to open and close the first switch; and a second coil operatively connected to the second switch, the second coil being controlled by the motor control module to open and close the second switch.

In some implementations of the present technology, resistances of the first and second resistors are selected as a function of a capacitance of the capacitor so that a current flowing between the battery and the capacitor in operation d) is less than or equal to a maximum current threshold.

In some implementations of the present technology, the motor control module is further configured for: between operations b) and c), determining that the second switch is closed if the output voltage increases at a rate corresponding to a relation between the capacitance of the capacitor and a sum of the resistances of the first and second resistors; between operations b) and c), determining that the second switched non-current limiting path is closed if the output voltage increases at a rate corresponding to a relation between the capacitance of the capacitor and the resistance of the first resistor; between operations c) and d), detecting that the first switch is closed if the output voltage increases at the rate corresponding to a relation between the capacitance of the capacitor and the sum of the resistances of the first and second resistors; and between operations c) and d), detecting that the first switched non-current limiting path is closed if the output voltage increases at a rate corresponding to a relation between the capacitance of the capacitor and the resistance of the second resistor.

In some implementations of the present technology, the motor control module is further configured for opening the first and second switched current-limiting paths after closing the first and second switched non-current-limiting paths.

In some implementations of the present technology, the motor control module is further configured for: verifying the output voltage after operation a) and before operation b); executing operation b) in response to the output voltage measured after operation a) being less than an early restart voltage threshold; and closing the first and second switched non-current-limiting paths in response to the output voltage measured after operation a) being equal to or greater than the early restart voltage threshold.

In some implementations of the present technology, the first switched non-current-limiting path comprises a first power contactor; and the second switched non-current-limiting path comprises a second power contactor.

In some implementations of the present technology, the system further comprises: a third coil operatively connected to the first power contactor, the third coil being controlled by the motor control module to open and close the first power contactor; and a fourth coil operatively connected to the second power contactor, the fourth coil being controlled by the motor control module to open and close the second power contactor.

In some implementations of the present technology, the motor control module is further configured for: receiving a shutdown command; and opening of any one of the first switched non-current-limiting path, the second switched non-current-limiting path, the first switched current-limiting path, and the second switched current-limiting path that is closed at a time of receiving the shutdown command.

In a second aspect, the present technology provides a diagnostic method for an electric system comprising a power stage of a vehicle, the method comprising: a) receiving, at the electric system, a command for a start procedure; b) after a), selectively closing a first switched current-limiting path connecting a first polarity of a battery to a first polarity of a power stage of the vehicle of the electric system; c) after b), if a magnitude of an output voltage between the first polarity of the power stage of the vehicle and a second polarity of the power stage of the vehicle is less than a first voltage threshold, opening the first switched current-limiting path and closing a second switched current-limiting path connecting a second polarity of the battery to the second polarity of the power stage of the vehicle; d) after c), if the magnitude of the output voltage is less than the first voltage threshold, closing the first switched current-limiting path; e) after d), if the magnitude of the output voltage increases to meet or exceed a second voltage threshold greater than the first voltage threshold, closing a first non-current-limiting path parallel to the first current-limiting path and closing a second switched non-current-limiting path parallel to the first current-limiting path.

In some implementations of the present technology, the command for the start procedure is received at a motor control module (MCM) controlling the electric system; and the first and second switched current-limiting paths and the first and second non-current-limiting paths are controlled by the MCM in response to receiving the command for the start procedure and in response to measurements of the output voltage.

In some implementations of the present technology, the method further comprises: aborting the start procedure at operation c) or d) in response to the magnitude of the output voltage meeting or exceeding the first voltage threshold, and aborting the start procedure at operation e) in response to the magnitude of the output voltage failing to meet or exceed the second voltage threshold.

In some implementations of the present technology, each of the first switched current-limiting path, the second switched current-limiting path, the first switched non-current limiting path and the second switched non-current limiting path is normally open.

In some implementations of the present technology, the method further comprises opening each of the first switched current-limiting path, the second switched current-limiting path, the first switched non-current limiting path and the second switched non-current limiting path before receiving the command for the start procedure.

In some implementations of the present technology, a capacitor is connected to the first and second polarities of the power stage of the vehicle; and closing the first and second switched current-limiting paths pre-charges the capacitor.

In some implementations of the present technology, closing the first switched current-limiting path comprises closing a first switch connected in series with a first resistor; and closing the second switched current-limiting path comprises closing a second switch connected in series with a second resistor.

In some implementations of the present technology, the method further comprises: energizing a first coil operatively connected to the first switch to close the first switch; and energizing a second coil operatively connected to the second switch to close the second switch.

In some implementations of the present technology, resistances of the first and second resistors are selected as a function of a capacitance of the capacitor so that a current flowing between the battery and the capacitor in operation d) is less than or equal to a maximum current threshold.

In some implementations of the present technology, the method further comprises: between operations b) and c), determining that the second switch is closed if the output voltage increases at a rate corresponding to a relation between the capacitance of the capacitor and a sum of the resistances of the first and second resistors; between operations b) and c), determining that the second switched non-current limiting path is closed if the output voltage increases at a rate corresponding to a relation between the capacitance of the capacitor and the resistance of the first resistor; between operations c) and d), detecting that the first switch is closed if the output voltage increases at the rate corresponding to a relation between the capacitance of the capacitor and the sum of the resistances of the first and second resistors; and between operations c) and d), detecting that the first switched non-current limiting path is closed if the output voltage increases at a rate corresponding to a relation between the capacitance of the capacitor and the resistance of the second resistor.

In some implementations of the present technology, the method further comprises opening the first and second switched current-limiting paths after closing the first and second switched non-current-limiting paths.

In some implementations of the present technology, the method further comprises: verifying the output voltage after operation a) and before operation b); executing operation b) in response to the output voltage measured after operation a) being less than an early restart voltage threshold; and closing the first and second switched non-current-limiting paths in response to the output voltage measured after operation a) being equal to or greater than the early restart voltage threshold.

In some implementations of the present technology, the first switched non-current-limiting path comprises a first power contactor; and the second switched non-current-limiting path comprises a second power contactor.

In some implementations of the present technology, the method further comprises: controlling a third coil operatively connected to the first power contactor to open and close the first power contactor; and controlling a fourth coil operatively connected to the second power contactor to open and close the second power contactor.

In some implementations of the present technology, the method further comprises: receiving a shutdown command at the electric system; and opening of any one of the first switched non-current-limiting path, the second switched non-current-limiting path, the first switched current-limiting path, and the second switched current-limiting path that is closed at a time of receiving the shutdown command.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology introduces a diagnostic method and a power delivery control system for an electric system comprising a battery and a power stage of a vehicle receiving power from the battery when power contactors therebetween are closed. Pre-charge functions are provided for initially applying a current-limited voltage from the battery to the power stage before applying a non-current-limited voltage from the battery to the power stage.

In the course of a diagnostic sequence initiated in response to receiving a command for starting the electric system, a first pre-charge is tested between a first polarity of the battery and a first polarity of the power stage. A second pre-charge is then tested between a second polarity of the battery and a second polarity of the power stage. None of the first and second pre-charge tests is expected to lead to an increase of voltage on the power stage. Should the power stage voltage increase, failure of a power contactor may have been detected and a starting sequence for the electric system is aborted. On the condition that the power stage voltage does not increase in the course of the first and second pre-charge tests, an actual pre-charge of the power stage is performed and the power stage voltage is expected to increase. Should the power stage voltage fail to increase in the course of the actual pre-charge, one component of the power delivery control system may have failed and the starting sequence for the electric system is aborted. For example, a measurement of the voltage applied on the power stage may have failed, potentially leading to an erroneous observation of the outcomes of the first and second pre-charge tests. On the condition that the power stage voltage does increase as expected in the course of the actual pre-charge of the power stage, the diagnostic is favorable and power may be delivered to the power stage by closing the power contactors.

The electric system may be part of the powertrain of an electric or hybrid vehicle, for example a car, a bus, a snowmobile, a motorcycle, an off-road vehicle, a kart, a boat, a drone, and the like.

Figure 1:
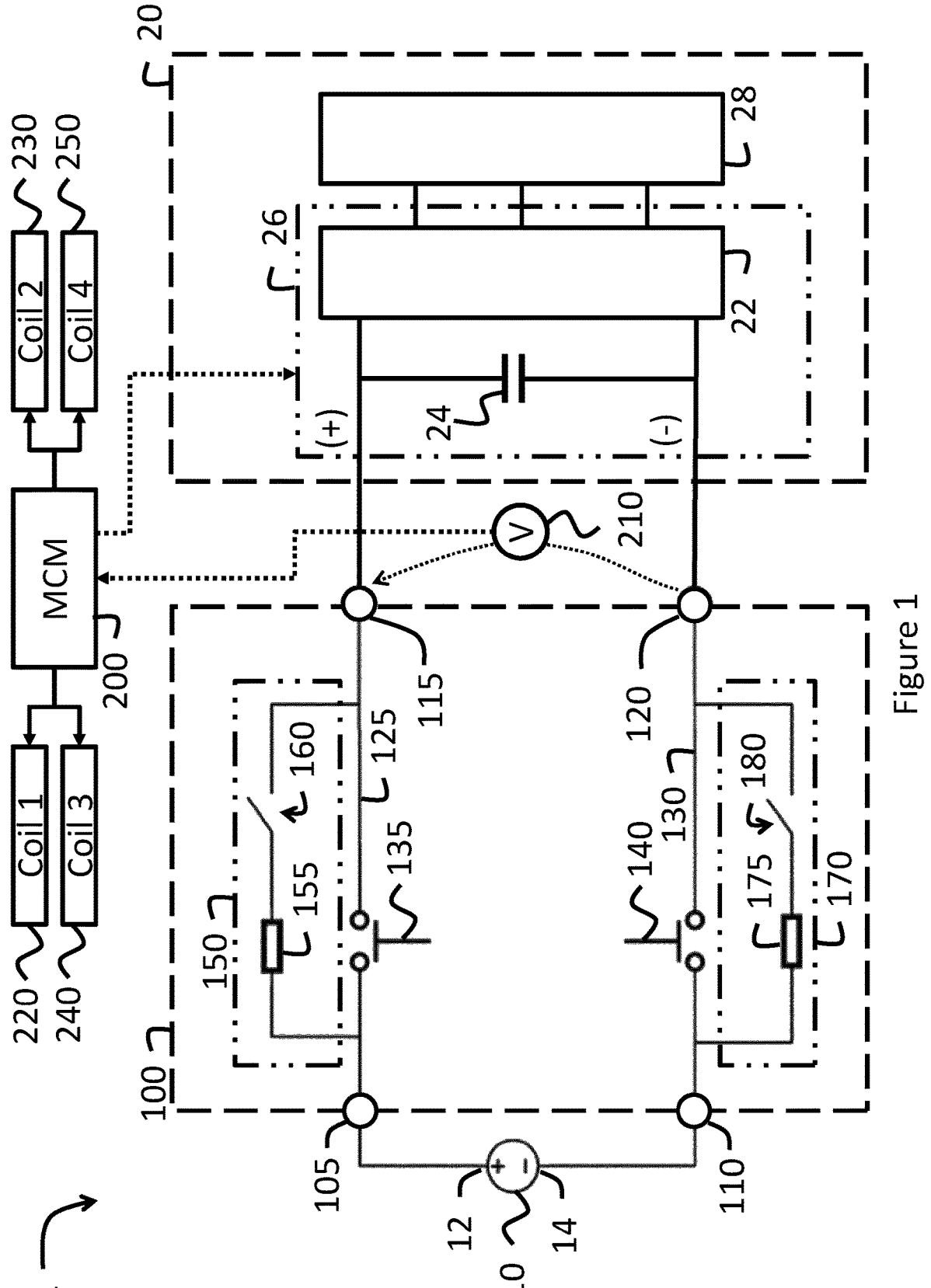
FIG. 1 is a schematic diagram of an electric system in accordance with an embodiment of the present technology.

FIG. 1 is a schematic diagram of an electric system 1 that may for example be installed in an electric (or hybrid) vehicle. The electric system 1 comprises a battery 10 for powering a power stage 20 of the vehicle via a contactor module 100 controlled by a motor control module (MCM) 200. The battery 10 (or a plurality of batteries forming a battery bank) may be a high-voltage battery rated, for example and without limitation, at 60 volts or more. In an example application, the battery 10 may provide 350 volts at up to 40 kW, which translates to an output current of up to 114 amperes. Some electric vehicles may have batteries capable of delivering even more power, through higher voltages and/or higher current levels. The power stage 20 comprises an inverter 26 for the electric vehicle, the inverter 26 converting DC power received from the battery 10 to AC power provided to an electric motor 28 for operating the electric vehicle. As illustrated, the inverter 26 also comprises a capacitor 24 (or a plurality of capacitors forming a capacitor bank) connected to positive and negative polarities of the of the power stage 20, being thus in parallel with a power switch assembly 22. The power switch assembly 22 comprises a plurality of power switches (not shown) that convert DC power to AC power.

The contactor module 100 includes an input 105 (which may also be called an input lead or an input port) connectable to a positive polarity of the battery 10, and another input 110 connectable to a negative polarity of the battery 10. The contactor module 100 also includes an output 115 (which may also be called an output lead or an output port) connectable to the positive polarity of the power stage 20, and another output 120 connectable to the negative polarity of the power stage 20. When the electric system 1 is not in use, electrical connections are cut between the input 105 and the output 115, and between the input 110 and the output 120.

In normal operation of the electric system 1, power is delivered from the battery 10 to the power stage 20 via a switched non-current-limiting path 125 extending between the input 105 and the output 110, and via a switched non-current-limiting path 130 extending between the input 110 and the output 120. As illustrated on FIG. 1, the switched non-current-limiting path 125 may be established by closing a power contactor 135 and the switched non-current-limiting path 130 may be established by closing a power contactor 140. The power contactors 135 and 140 are therefore both open when the electric system 1 is not in use, and both closed when the electric system 1 is used, for example, to power the electric vehicle. When the power contactors 135 and 140 are closed, an output voltage of the contactor module 100 between the outputs 115 and 120 is substantially equal to a voltage of the battery 10, with only insignificant voltage drops in the various components of the contactor module 100. This output voltage is thus applied on the power stage 20 of the vehicle and is present on the capacitor 24.

The contactor module 100 also comprises a switched current-limiting path 150 that extends between the input 105 and the output 110, being therefore mounted in parallel with the switched non-current-limiting path 125. The contactor module 100 further comprises a switched current-limiting path 170 that extends between the input 115 and the output 120, being therefore mounted in parallel with the switched non-current-limiting path 130. As illustrated, in the present embodiment, the switched current-limiting path 150 has a resistor 155 in series with a switch 160, and the switched current-limiting path 170 has a resistor 175 in series with a switch 180. For example and without limitation, the resistors 155 and 175 may each have a 200 ohms resistance. Other techniques may be contemplated for implementing the switched current-limiting paths 150 and 170. In non-limiting examples, each of the resistors 155 and 175 may be substituted with an inductance (not shown) alone or in combination with a power transistor (not shown) and a solid-state relay (not shown), a power transistor (not shown) may be gradually turned on using pulse width modulation.

When the electric system 1 is inactive, the battery 10 may be partially or fully charged and have a voltage that is greater than 0 volt. At the same time, unless the electric system 1 has recently been shut down, the voltage applied on the power stage 20 and its component is expected to be very low. In an embodiment, each of the switched current-limiting path 150, the switched current-limiting path 170, the switched non-current limiting path 125 and the switched non-current limiting path 130 is a normally open device, so each of these paths is open and non-conductive when the electric system 1 is inactive. Upon start of the electric system 1, closing the power contactors 135 and 140 at once could lead to the delivery of a large, unhindered inrush current from the battery to the power stage 20, the capacitor 24 initially acting as a short circuit until charged to a voltage close to the battery voltage. This inrush current might severely damage various components of the electric system 1.

The capacitor 24 may be pre-charged in a gradual fashion in order to avoid such potential damage. The inrush current may be limited by opening at least one of the switched non-current-limiting paths 125 and 130, for example by opening at least one of the power contactors 135 and 140, and by closing at least one of switched current-limiting paths 150 or 170 mounted in parallel with the open one of the switched non-current-limiting paths 125, 130, so that the current flowing between the battery 10 and the power stage 20 flows through at least one of the switched current-limiting paths 150 or 170, in which the resistor 155 or 175 limits the value of the current.

Considering, for example and without limitation, a scenario in which, at the same time, the power contactor 135 is open, the power contactor 140 is closed and the switch 160 is closed, a current may flow from a positive terminal 12 of the battery 10, through the resistor 155, the closed switch 160, the power stage 20 (including the capacitor 24), and the closed power contactor 140, returning to a negative terminal 14 of the battery 10. The resistor 155 should normally limit a flow of current to a safe level within this circuit, allowing to pre-charge the capacitor 24 at a gradual rate. In that context, the switched current-limiting path 150 may be understood as a pre-charge circuit for the capacitor 24. An equivalent scenario may be obtained when, at the same time, the power contactor 140 is open, the power contactor 135 is closed and the switch 180 is closed. Current may be further limited by opening both power contactors 135 and 140 and by closing both switches 160 and 180 so that the current flows through both resistors 155 and 175.

Returning to one of the above-described scenarios in which, upon start of the electric system 1, the power contactor 135 is opened while the power contactor 140 is closed and the switch 160 is closed, if the power contactor 135 has failed and is welded in a closed position, the resistor 155 will be placed in parallel with the effectively closed switched non-current-limiting path 125 and there will be no significant resistive path to reduce the inrush current flowing from the battery 10 to the power stage 20, as the battery 10 will be connected to power stage 20 at a time when it is expected to be disconnected.

The present technology introduces a diagnostic sequence that may be executed upon starting the electric system 1 for detecting failure of one of the switched current-limiting paths 125 or 130, in particular a failure of one of the power contactors 135 or 140. Embodiments of the present technology further detect failure of one or the switches 160 or 180 and may further implement a self-diagnosis of the failure detection. The diagnostic sequence is not dependent on any particular implementation of the switched current-limiting paths 150 and 170 or on any particular implementation of the switched non-current-limiting paths 125 and 130.

In an embodiment, as illustrated in FIG. 1, a power delivery control system comprises the contactor module 100, the MCM 200 and a voltage sensor 210, for example a voltmeter. The voltage sensor 210 is connected to the outputs 115 and 120 to provide an output voltage of the contactor module 100. When connected to the battery 10 and to the power stage 20 as shown on FIG. 1, the power delivery control system selectively delivers power from the battery 10 to the power stage 20 in response to a command for a start procedure received by the MCM 200. The MCM 200 controls operations of the switched non-current-limiting paths 125 and 130 and of the switched current-limiting paths 150 and 170 of the contactor module 100. The MCM 200 may also control operation of the power stage 20 of the electric vehicle. In an embodiment, the MCM 200 may receive the command for the start procedure for the electric system 1 and for the vehicle from a start button 290 (FIG. 4) or from a start key for the vehicle. In response to the command for the start procedure, the MCM 200 may first obtain a measurement of a voltage of the battery 10 from a voltage sensor 16, for example another voltmeter, and act upon this command on the condition that the voltage of the battery 10 is deemed sufficient to operate the electrical system 1.

In more details, the MCM 200 controls a plurality of relays operatively connected to the connector module 100. A first relay comprises the switch 160 actuated by a coil 220 energized by the MCM 200. A second relay comprises the switch 180 actuated by a coil 230 energized by the MCM 200. A third relay comprises the power contactor 135 actuated by a coil 240. A fourth relay comprises the power contactor 140 actuated by a coil 250. In a non-limiting embodiment, the switches 160 and 180 as well as the power contactors 135 and 140 are normally open and are therefore non-conductive when their respective coils are not energized, closing, and becoming conductive when their respective coils are energized by the MCM 200. In particular, the use of normally open switches 160 and 180 and the use of normally open power contactors 135 and 140 may prevent accidentally maintaining contact between the battery 10 and the power stage 20 after shutdown of the electric system 1. Regardless, use of dual-coil latching relays having one coil for closing and another coil for opening their contactors is also contemplated.

Figure 2:
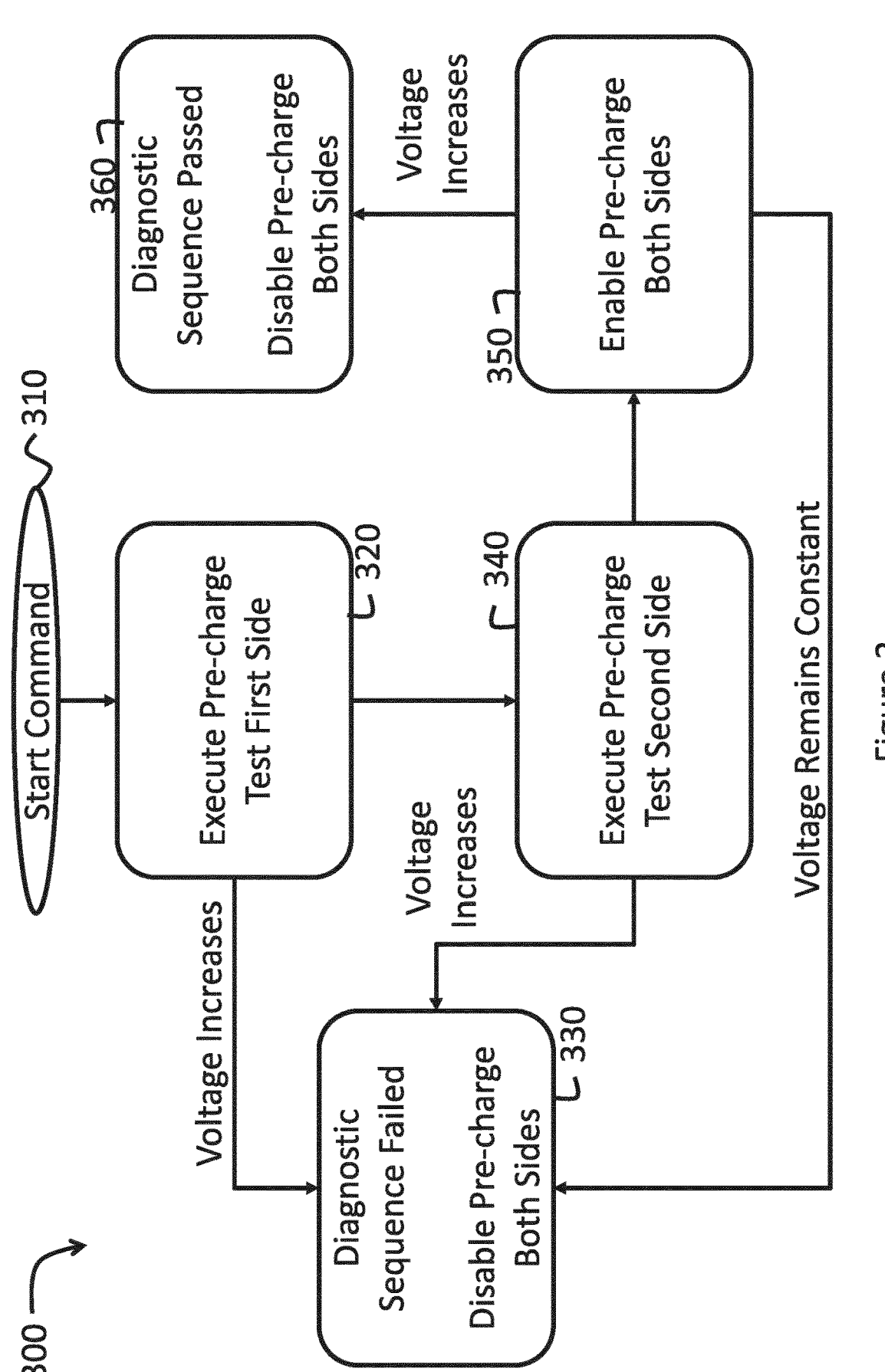
FIG. 2 is a block diagram of a diagnostic sequence implemented in a power delivery control system in accordance with an embodiment of the present technology.

The MCM 200 implements a logic for actuating the power contactors 135 and 140 as well as the switches 160 and 180 according to measurements of the output voltage of the contactor module 100 provided by the voltage sensor 210. As illustrated on FIG. 1, the output voltage of the contactor module 100 is also a voltage applied on the capacitor 24 and on the inverter 26. Depending on the manner in which the voltage sensor 210 is connected to the contactor module 100, the reported voltage may be positive or negative. Consequently, the MCM 200 may consider the magnitude of the output voltage for controlling the contactor module 100. This logic is illustrated as a simplified diagnostic sequence 300 in FIG. 2. Prior to the start of the sequence, all current-limiting and non-current limiting paths of the contactor module 100 are expected to be open and non-conductive. The diagnostic sequence 300 is intended to determine whether any one of these paths may have previously failed and are actually closed and conductive.

Operation 310 comprises receiving, at the MCM 200, a command for a start procedure for the electric system 1. At the time, the non-current-limiting paths 125 and 130 and the current-limiting paths 150 and 170 should all be open. If any one of the power contactors 135 and 140 or the switches 160 and 180 is not a normally open device, the MCM 200 may cause their opening by selectively energizing and/or de-energizing their respective coils 240, 250, 220 and/or 230 before receiving the command for the start procedure, for example when shutting down the electric system 1. In response to the command for the start procedure, a pre-charge test of the power stage 20, for example a pre-charge test of the capacitor 24, is executed at operation 320. To this end, the MCM 200 closes either one of the current-limiting paths 150 or 170. For illustration purposes, the MCM 200 may first close the current-limiting path 150 by closing the switch 160. Once the switch 160 is closed, the MCM 200 considers a value of the output voltage of the contactor module 100 provided by the voltage sensor 210.

If both the current-limiting path 170 and the non-current-limiting 130 are open and non-conductive, no current may flow between the battery 10 and the power stage 20, and the measured output voltage should normally be lower than a low voltage threshold. This low voltage threshold may be somewhat greater than 0 volt, as some residual charges may be present in the capacitor 24, but should be significantly lower than a nominal operating voltage of the electric system 1. If, however, the output voltage reported by the voltage sensor 210 increases over time and exceeds the low voltage threshold, some current may be flowing between the battery 10 and the power stage 20. This may be caused, for example, by the power contactor 140 being welded and conducting, or by the switch 180 having failed to open.

In an embodiment, the MCM 200 may detect which one of the power contactor 140 or the switch 180 is closed, at a time when it should normally be open, based on a rate of increase of the output voltage. If the power contactor 140 is welded closed, the rate of increase of the output voltage corresponds to a relation between a capacitance of the capacitor 24 and the resistance of the resistor 155. If the switch 180 has failed to open and the power contactor 140 is properly open, the rate of increase of the output voltage corresponds to a relation between the capacitance of the capacitor 24 and the sum of the resistances of the resistors 155 and 175. The output voltage increases more rapidly if the power contactor 140 has failed because of the lower resistance in the electric system 1 at the time.

The MCM 200 may therefore analyse successive voltage measurements reported by the voltage sensor 210 to determine which of the switches 160 or 180 or which of the power contactors 135 or 140 may have failed. In each of operations 320, 340 and 350 of the diagnostic sequence 300, a respective time constant $\tau$=RC of the electric circuit 1 depends on a known capacitance C of the capacitor 24 and a resistance R that may comprise either one of the resistors 155 or 175, or a series combination of the resistors 155 and 175, depending on which of the switches 160 and 180 and the power contactors 125 and 130 are closed. The value R should be infinite in operations 320 and 340 if all components of the contactor module 100 operate properly. The MCM 200 may observe the rate of increase of the output voltage to determine T. Given the known value C of the capacitor 24, the MCM 200 may calculate the value R and thereby determine whether the current is flowing through one of both or none of the resistors 155 and 175 in the course of operations 320, 340 and 350.

No matter the cause, an output voltage increase at operation 320 indicates that the pre-charge test of operation 320 has failed, so the diagnostic sequence 300 moves to operation 330 where the diagnostic is marked as having failed in the MCM 200. The current-limiting path 150 is opened, in this example by opening the switch 160 and the diagnostic sequence 300 ends.

Provided that the MCM 200 does not detect any voltage increase after operation 320, the diagnostic sequence 300 moves to operation 340, in which the MCM 200 initiates another pre-charge test of the capacitor 24 by opening the current-limiting path 150, and closing the other the current-limiting path 170, by closing the switch 180 in the present example. The MCM 200 considers once again a value of the output voltage of the contactor module 100 provided by the voltage sensor 210. Operation 340 is equivalent to operation 320 and may eventually lead to detection of failures of the current-limiting path 150 or of the non-current limiting path 125, in which case the diagnostic sequence 300 may also move to operation 330 and be terminated.

In response to a satisfying evaluation at operation 340, by having the output voltage not exceeding the low voltage threshold, the diagnostic sequence 300 moves to operation 350 in which both current-limiting paths 150 and 170 are closed, by closing both switches 160 and 180, to enable an actual pre-charge of the power stage 20, i.e. of the capacitor 24. Current should normally flow from the positive terminal 12 of the battery 10, through the resistor 155, the closed switch 160, the power stage 20 (pre-charging the capacity 24), the closed switch 160 and the resistor 175, returning to the negative terminal 14 of the battery 10. Resistances of the resistors 155 and 175 may be selected, for a given known capacitance of the capacitor 24, so that the current does not exceed a maximum current threshold in order to avoid damage to the electric system 1. In an embodiment, the maximum current threshold may be determined as a function of a rated power of the electric motor 28. Alternatively or in addition, the resistances of the resistors 155 and 175 may also be selected so that an operating voltage threshold greater than the low voltage threshold, for example and without limitation 80% of the nominal operating voltage of the electric system 1, is reached within a short time, for example and without limitation 0.8 seconds.

The MCM 200 is therefore expected to receive, from the voltage sensor 210, successive voltage measurements showing a gradual increase up to close to the output voltage of the battery 10. If the output voltage increases as expected at operation 350, the diagnostic sequence 300 arrives at a positive outcome and the diagnostic sequence 300 ends at operation 360, in which the diagnostic is marked as successful in the MCM 200. The MCM 200 may disable the pre-charge of the power stage 20 (i.e. of the capacitor 24) on both the positive and negative sides by de-energizing the coils 220 and 230 to open the switches 160 and 180. The MCM 200 closes the power contactors 135 and 140 to allow delivering power from the battery 10 to the power stage 20. The electric system 1 may now be put in operation. In particular, the MCM 200 may now control the power switch assembly 22 to operate the vehicle.

If, at operation 350, measurements provided by the voltage sensor 210 to the MCM 200 do not show a voltage increase at the outputs 115 and 120 of the contactor module 100, the diagnostic sequence 300 is considered having failed and the sequence terminates at operation 330. One possible reason for this failed outcome at operation 350 may include a failure of the voltage sensor 210 that may fail to detect a normal output voltage increase at operation 350 or that may have failed to detect an abnormal output voltage increase at operation 320 or 340. Another possible reason for this failed outcome at operation 350 may include a failure of one of the switches 160 or 180, which may have failed to close at operations 320, 340 or 350.

Execution of the diagnostic sequence 300 may be unnecessary if the output voltage of the contactor module 100 meets or exceeds an early restart voltage threshold when the MCM 200 receives the command for the start procedure. This may be the case, for example and without limitation, when the command is received soon after shutdown of the electric system 1, as the capacitor 24 may have conserved sufficient charges for the output voltage reaching the early restart voltage threshold. In this situation, closing both the non-current-limiting paths 125 and 130 should not cause a large inrush current, given a low difference between the voltage of the battery 10 and the output voltage of the contactor module 100, which is also the voltage on the capacitor 24. For example and without limitation, the early restart voltage threshold may be equal to the operating voltage threshold. In some implementations, the power stage 20 may be configured to discharge the capacitor 24 when the electric system 1 is shutdown, the rate of discharge of the capacitor 24 being according to the needs of a particular implementation. As such, use of the term 'early' in 'early restart voltage threshold' may relate to receiving the command for the start procedure within seconds or minutes of a shutdown of the electric system 1.

Figure 3A:
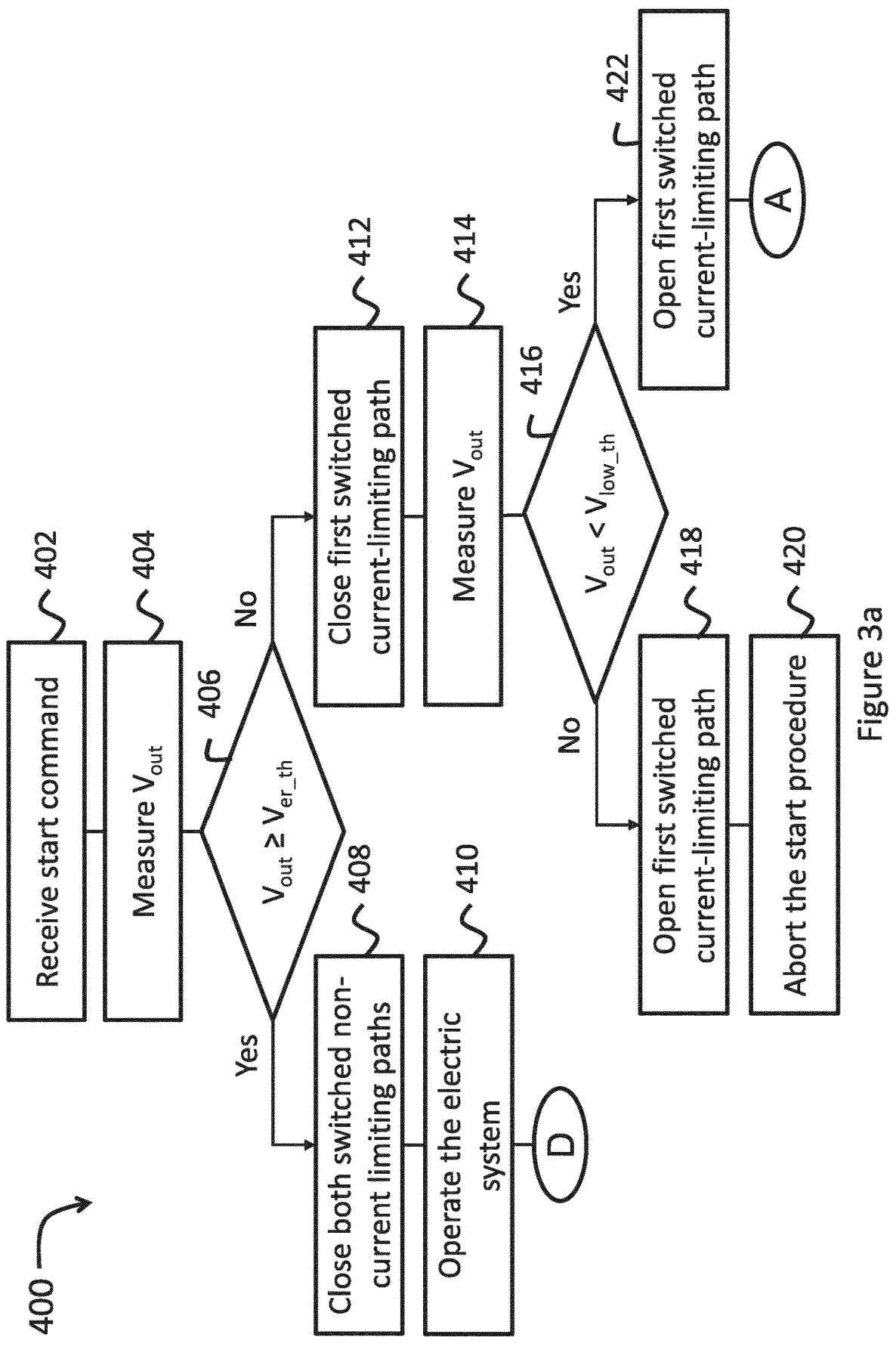
FIGS. 3a, 3b and 3c illustrate a sequence diagram showing operations of a diagnostic method for an electric system in accordance with an embodiment of the present technology.
Figure 3B:
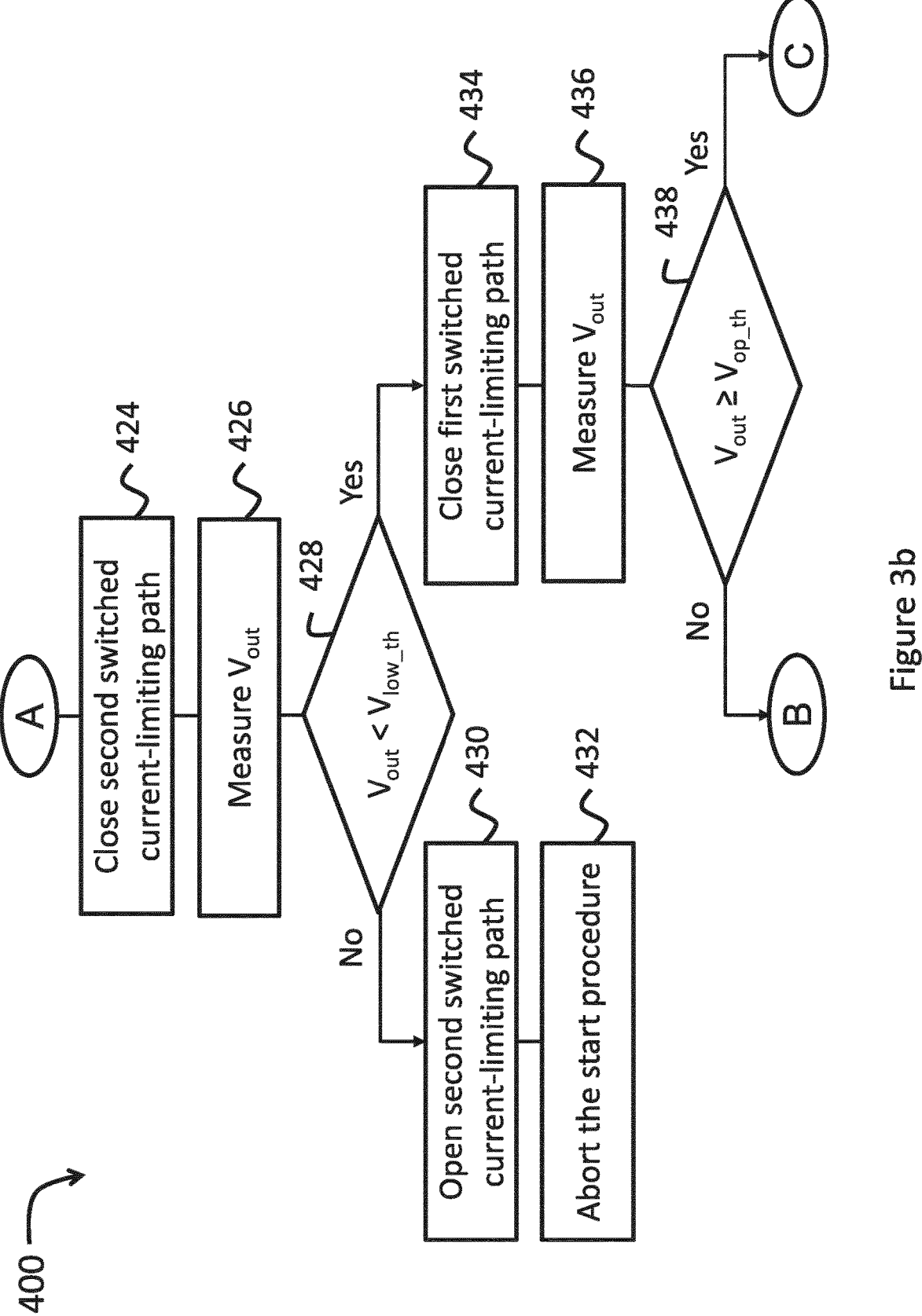
Figure 3C:
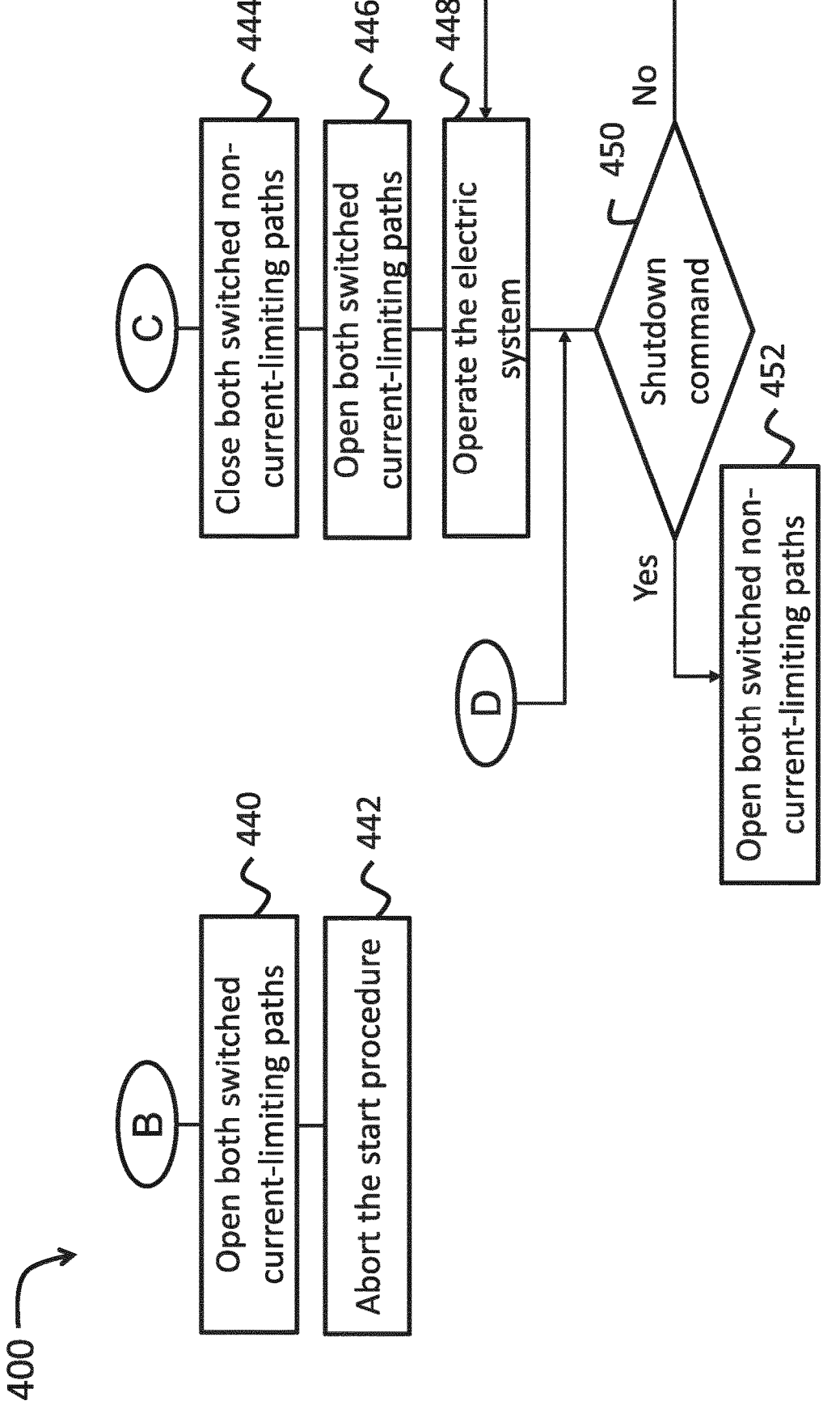

FIGS. 3a, 3b and 3c illustrate a sequence 400 including operations of a diagnostic method for the electric system 1. The sequence 400 comprises a plurality of operations, some of which may be executed in variable order, some of the operations possibly being executed concurrently, some of the operations being optional. In an embodiment, the operations of the sequence 400 are controlled by the MCM 200. The sequence 400 will be described in the following paragraphs considering an example in which a first pre-charge test of the capacitor 24 is executed by closing the switch 160 of the current-limiting path 150, a second pre-charge test of the capacitor 24 being then executed by closing the switch 180 of the current-limiting path 170. The sequence 400 may also be executed in the opposite order.

The sequence 400 begins at operation 402, shown on FIG. 3a, when a command for a start procedure is received. The output voltage $V_{out}$ of the contactor module 100 is measured at operation 404. Then at operation 406, if the output voltage $V_{out}$ meets or exceeds the early restart voltage threshold $V_{er\_th}$, both non-current limiting paths 125 and 130 are closed to allow delivery of power from the battery 10 to the power stage 20, by closing both power contactors 135 and 140 at operation 408, and the electric system 1 is placed in operation at operation 410.

If the output voltage $V_{out}$ is less than the early restart voltage threshold $V_{er\_th}$ at operation 406, the sequence 400 continues at operation 412 where the current-limiting path 150 is closed by closing the switch 160. The output voltage $V_{out}$ of the contactor module 100 is measured at operation 414. Then, at operation 416, if the output voltage $V_{out}$ meets or exceeds the low voltage threshold $V_{low\_th}$, either the power contactor 140 of the switched non-current-limiting path 130 or the switch 180 of the current-limiting path 170 is determined to be closed when it should normally be open. In this case, the sequence 400 continues at operation 418 in which the first current-limiting path 150 that was closed at operation 412 is opened. In an embodiment, operation 416 may comprise evaluating a rate of increase of the output voltage $V_{out}$. To this end, if the rate of increase of the output voltage is consistent with the value of the capacitor 24 in relation with the resistance of the resistor 155, the power contactor 140 is determined to be closed. If the rate of increase of the output voltage is consistent with the value of the capacitor 24 in relation with a series combination of the resistors 155 and 175, the switch 180 is determined to be closed. In any case, after operation 418, the start procedure is aborted at operation 420.

If the output voltage $V_{out}$ is less than the low voltage threshold $V_{low\_th}$ at operation 416, the current-limiting path 150 that was closed at operation 412 is opened at operation 422 and, continuing on FIG. 3b, the current-limiting path 170 is closed at operation 424. The output voltage $V_{out}$ of the contactor module 100 is measured again at operation 426. Then, at operation 428, if the output voltage $V_{out}$ meets or exceeds the low voltage threshold $V_{low\_th}$, either the power contactor 135 of the switched non-current-limiting path 125 or the switch 160 of the current-limiting path 150 determined to be closed when it should normally be open. In this case, the sequence 400 continues at operation 430 in which the current-limiting path 170 that was closed at operation 424 is opened. In an embodiment, operation 426 may comprise evaluating a rate of increase of the output voltage $V_{out}$. To this end, if the rate of increase of the output voltage is consistent with the value of the capacitor 24 in relation with the resistance of the resistor 175, the power contactor 135 is determined to be closed. If the rate of increase of the output voltage is consistent with the value of the capacitor 24 in relation with a series combination of the resistors 155 and 175, the switch 160 is determined to be closed. In any case, after operation 430, and the start procedure is aborted at operation 432.

If the output voltage $V_{out}$ is less than the low voltage threshold $V_{low\_th}$ at operation 428, the first current-limiting path 150 or 170 is closed again at operation 434. At that time, the second current-limiting path 150 or 170 that was closed at operation 424 is still closed, so current may flow between the battery 10 and the power stage 20 via the two current-limiting paths 150 and 170 to pre-charge the capacitor 24. The output voltage $V_{out}$ is measured once more at operation 436. Then at operation 438, if the output voltage $V_{out}$ fails to increase to meet the operating voltage threshold $V_{op\_th}$, the measurements of the output voltage $V_{out}$ at operations 404, 414, 426 and/or 432 may have been incorrect, for example due to a failure of the voltage sensor 210. In this case, as shown on FIG. 3c, both current-limiting paths 150 and 170 are opened at operation 440 and the start procedure is aborted at operation 442.

If, at operation 438, the output voltage $V_{out}$ meets or exceeds the operating voltage threshold $V_{op\_th}$, the diagnostic of the electric system 1 is successful. Both non-current limiting paths 125 and 130 are closed at operation 444, by closing both power contactors 135 and 140, to allow current to flow without restriction between the battery 10 and the power stage 20. Both non-current limiting paths 150 and 170 are opened at operation 446, for example to avoid continued energizing of the coils 220 and 230 by the MCM 200. The electric system 1 is then operated at operation 448.

Whether the electric system 1 has been placed in operation at operation 410 (FIG. 3a) or at operation 448, a shutdown command may be received at operation 450. In response to receiving the shutdown command, both non-current-limiting paths are opened at operation 452 to stop delivery of power from the battery 10 to the power stage 20 by opening both contactors 135, 140.

Figure 4:
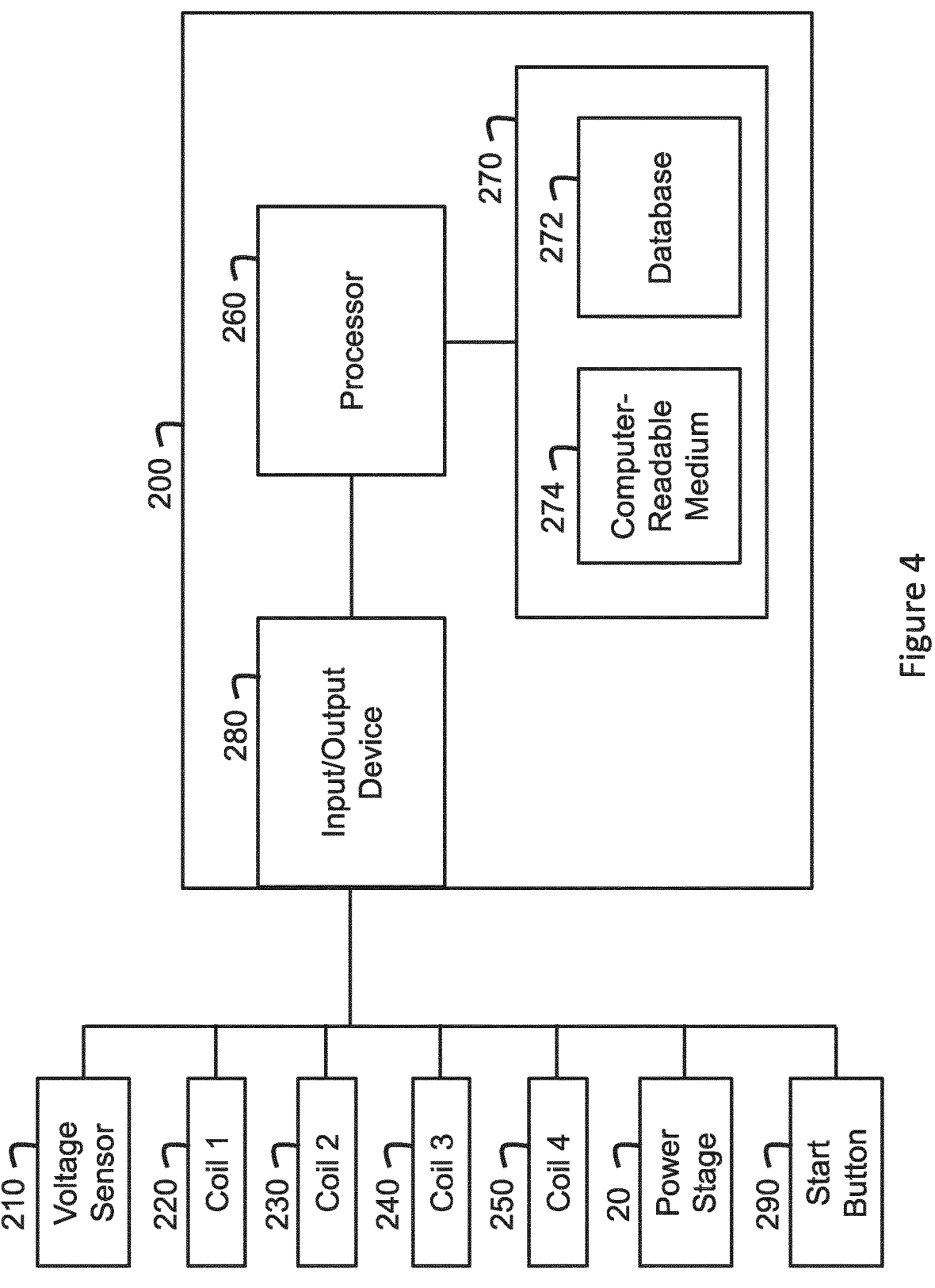
FIG. 4 is a block diagram of a motor control module in accordance with an embodiment of the present technology.

Operations of the sequences 300 and 400 that are executed by the MCM 200 may be configured to be processed by one or more processors, the one or more processors being coupled to a memory. FIG. 4 is a block diagram of MCM 200 according to an embodiment.

The MCM 200 of FIG. 4 comprises a processor or a plurality of cooperating processors (represented as a single processor 260 for simplicity), a memory device or a plurality of memory devices (represented as a single memory device 270 for simplicity), an input/output device or a plurality of input/output devices (represented as an input/output device 280 for simplicity). Separate input and output devices may be present instead of the input/output device 280. The processor 260 is operatively connected to the memory device 270 and to the input/output device 280.

The input/output device 280 receives a command to start the electric system 1 from a start button 290 (or from a start key or a similar device) and reports receipt of this command to the processor 260. The input/output device 280 also receives measurements of the output voltage of the contactor module 100 from the voltage sensor 210 and reports these measurements to the processor 260 that, in turn, controls operation of the contactor module 100. This control of the contactor module 100 is effected when the processor 260 causes the input/output device 280 to energize and de-energize the coils 220, 230, 240 and 250 as appropriate to close and open the switches 160 and 180 and of the power contactors 135 and 140. The input/output device 200 may comprise amplifier/buffers (not show) that provide sufficient current at appropriate voltages for energizing the coils 220, 230, 240 and 250. The processor 260 may also communicate with the power stage 20, via the input/output device 280, providing control instructions and receiving feedback signals for operating the electric system 1, for operating the vehicle.

The memory device 270 has a database 272 for storing data which may include, for example, the above-mentioned low voltage threshold, operating voltage threshold, maximum current threshold, time range for reaching the operating voltage threshold, the early restart voltage threshold, and the like, that are used by the processor 260. The memory device 270 has a non-transitory computer-readable medium 274 for storing code instructions that are executable by the processor 260 to perform the operations of the sequences 300 and 400.

For example, the processor 260 may execute the code instructions stored in the non-transitory computer-readable medium 274 for:

a. receiving, from the start button 290 via the input/output device 280, a command for a start procedure;

b. in response to receiving the command for the start procedure, verifying that the output voltage reported by the voltage sensor 210 is less than the early restart voltage threshold;

c. closing the first and second switched non-current-limiting paths 125 and 130 in response to the output voltage being equal or greater than the early restart voltage threshold;

d. in response to the output voltage being less than the early restart voltage threshold, closing one of the switched current-limiting paths 150 or 170 (i.e. closing the switched current-limiting paths 150 in the present example);

e. after closing of the switched current-limiting paths 150, if a magnitude of the output voltage meets or exceeds the low voltage threshold, aborting the start procedure, otherwise opening the switched current-limiting paths 150 and closing the other switched current-limiting path 170;

f. after closing of the other switched current-limiting path 170, if the magnitude of the output voltage meets or exceeds the low voltage threshold, aborting the start procedure, otherwise closing again the switched current-limiting paths 150;

g. now that both switched current-limiting paths 150 and 170 are closed, aborting the start procedure if the magnitude of the output voltage fails to meet or exceed the second voltage threshold, otherwise closing the switched non-current-limiting paths 125 and 130; and h. opening the current-limiting paths 150 and 170 after closing the switched non-current-limiting paths 125 and 130.

In addition, the processor 260 may execute the code instructions stored in the non-transitory computer-readable medium 274 for:

a. when aborting the start procedure due to the magnitude of the output voltage meeting or exceeding the low voltage threshold, detecting that one of the switches 160 or 180 is closed, at a time when it should normally be open, if the output voltage increases at a rate corresponding to a relation between the capacitance of the capacitor 24 and the sum of the resistances of the resistors 155 and 175; and b. when aborting the start procedure due to the magnitude of the output voltage meeting or exceeding the low voltage threshold, detecting that one of the switched non-current-limiting paths 125 or 130 is closed, at a time when it should normally be open, if the output voltage increases at a rate corresponding to a relation between the capacitance of the capacitor 24 and the resistance of one of the resistors 155 and 175.

The processor 260 may further execute the code instructions stored in the non-transitory computer-readable medium 274 for receiving, via the input/output device 280, a shutdown command from the start button 290 and for opening any one of the first and second non-current-limiting paths 125 and 130 and of the current-limiting paths 150 and 170 that may be closed at a time when the shutdown command is received.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A power delivery control system configured for selectively delivering power from a battery to a power stage of a vehicle, the power delivery control system comprising:
a contactor module, comprising:
a first switched non-current-limiting path connectable between a first polarity of the battery and a first polarity of the power stage of the vehicle,
a first switched current-limiting path mounted in parallel with the first switched non-current-limiting path,
a second switched non-current-limiting path connectable between a second polarity of the battery and a second polarity of the power stage of the vehicle,
a second switched current-limiting path mounted in parallel with the second switched non-current-limiting path,
a voltage sensor configured for measuring an output voltage of the contactor module between the first and second polarities of the power stage of the vehicle; and

16 a motor control module operatively connected to the first and second switched non-current-limiting paths, to the first and second switched current-limiting paths, and to the voltage sensor, the motor control module being configured for:
a) initiating a start procedure in response to receiving a command for the start procedure,
b) after a), during the start procedure, selectively closing the first switched current-limiting path,
c) after b), during the start procedure, in response to a magnitude of the output voltage being less than a first voltage threshold, opening the first switched current-limiting path and closing the second switched current-limiting path,
d) after c), during the start procedure, in response to the magnitude of the output voltage being less than the first voltage threshold, closing the first switched current-limiting path,
e) after d), during the start procedure, in response to the magnitude of the output voltage increasing to meet or exceed a second voltage threshold greater than the first voltage threshold, closing the first and second switched non-current-limiting paths.

2. The system of claim 1, wherein the contactor module further comprises:
a first input configured for being electrically connected to the first polarity of the battery;
a second input configured for being electrically connected to the second polarity of the battery;
a first output configured for being electrically connected to the first polarity of the power stage of the vehicle; and
a second output configured for being electrically connected to the second polarity of the power stage of the vehicle;
wherein:
the first switched non-current limiting path and the first switched current limited path extend between the first input and the first output of the contactor module,
the second switched non-current limiting path and the second switched current limited path extend between the second input and the second output of the contactor module, and
the voltage sensor is configured for measuring the output voltage of the contactor module between the first and second outputs of the contactor module.

3. The system of claim 1, wherein the motor control module is further configured for:
aborting the start procedure at operation c) or d) in response to the magnitude of the output voltage meeting or exceeding the first voltage threshold, and
aborting the start procedure at operation e) in response to the magnitude of the output voltage failing to meet or exceed the second voltage threshold.

4. The system of claim 1, wherein each of the first switched current-limiting path, the second switched current-limiting path, the first switched non-current limiting path and the second switched non-current limiting path is normally open.

5. The system of claim 1, wherein the motor control module is further configured for opening each of the first switched current-limiting path, the second switched current-limiting path, the first switched non-current limiting path and the second switched non-current limiting path before receiving the command for the start procedure.

6. The system of claim 4, further comprising:

a capacitor connected to the first and second polarities of the power stage of the vehicle;

wherein:

the first switched current-limiting path is a first pre-charge circuit for the capacitor;

the second switched current-limiting path is a second pre-charge circuit for the capacitor;

the first switched current-limiting path comprises a first switch connected in series with a first resistor;

the second switched current-limiting path comprises a second switch connected in series with a second resistor; and resistances of the first and second resistors are selected as a function of a capacitance of the capacitor so that a current flowing between the battery and the capacitor in operation d) is less than or equal to a maximum current threshold.

7. The system of claim 6, wherein the motor control module is further configured for:

between operations b) and c), determining that the second switch is closed if the output voltage increases at a rate corresponding to a relation between the capacitance of the capacitor and a sum of the resistances of the first and second resistors;

between operations b) and c), determining that the second switched non-current limiting path is closed if the output voltage increases at a rate corresponding to a relation between the capacitance of the capacitor and the resistance of the first resistor;

between operations c) and d), detecting that the first switch is closed if the output voltage increases at the rate corresponding to a relation between the capacitance of the capacitor and the sum of the resistances of the first and second resistors; and between operations c) and d), detecting that the first switched non-current limiting path is closed if the output voltage increases at a rate corresponding to a relation between the capacitance of the capacitor and the resistance of the second resistor.

8. The system of claim 1, wherein the motor control module is further configured for opening the first and second switched current-limiting paths after closing the first and second switched non-current-limiting paths.

9. The system of claim 1, wherein the motor control module is further configured for:

verifying the output voltage after operation a) and before operation b);

executing operation b) in response to the output voltage measured after operation a) being less than an early restart voltage threshold; and closing the first and second switched non-current-limiting paths in response to the output voltage measured after operation a) being equal to or greater than the early restart voltage threshold.

10. The system of claim 1, wherein the motor control module is further configured for:

receiving a shutdown command; and opening of any one of the first switched non-current-limiting path, the second switched non-current-limiting path, the first switched current-limiting path, and the second switched current-limiting path that is closed at a time of receiving the shutdown command.

11. A diagnostic method for an electric system comprising a power stage of a vehicle, the method comprising:

a) initiating a start procedure in response to receiving, at the electric system, a command for the start procedure;

b) after a), during the start procedure, selectively closing a first switched current-limiting path connecting a first polarity of a battery to a first polarity of a power stage of the vehicle of the electric system;

c) after b), during the start procedure, if a magnitude of an output voltage between the first polarity of the power stage of the vehicle and a second polarity of the power stage of the vehicle is less than a first voltage threshold, opening the first switched current-limiting path and closing a second switched current-limiting path connecting a second polarity of the battery to the second polarity of the power stage of the vehicle;

d) after c), during the start procedure, if the magnitude of the output voltage is less than the first voltage threshold, closing the first switched current-limiting path;

e) after d), during the start procedure, if the magnitude of the output voltage increases to meet or exceed a second voltage threshold greater than the first voltage threshold, closing a first non-current-limiting path parallel to the first current-limiting path and closing a second switched non-current-limiting path parallel to the first current-limiting path.

12. The method of claim 11, wherein:

the command for the start procedure is received at a motor control module (MCM) controlling the electric system; and the first and second switched current-limiting paths and the first and second non-current-limiting paths are controlled by the MCM in response to receiving the command for the start procedure and in response to measurements of the output voltage.

13. The method of claim 11, further comprising:

aborting the start procedure at operation c) or d) in response to the magnitude of the output voltage meeting or exceeding the first voltage threshold, and aborting the start procedure at operation e) in response to the magnitude of the output voltage failing to meet or exceed the second voltage threshold.

14. The method of claim 11, wherein each of the first switched current-limiting path, the second switched current-limiting path, the first switched non-current limiting path and the second switched non-current limiting path is normally open.

15. The method of claim 11, further comprising opening each of the first switched current-limiting path, the second switched current-limiting path, the first switched non-current limiting path and the second switched non-current limiting path before receiving the command for the start procedure.

16. The method of claim 14, wherein:

a capacitor is connected to the first and second polarities of the power stage of the vehicle;

closing the first and second switched current-limiting paths pre-charges the capacitor;

closing the first switched current-limiting path comprises closing a first switch connected in series with a first resistor;

closing the second switched current-limiting path comprises closing a second switch connected in series with a second resistor; and resistances of the first and second resistors are selected as a function of a capacitance of the capacitor so that a current flowing between the battery and the capacitor in operation d) is less than or equal to a maximum current threshold.

17. The method of claim 16, further comprising:

between operations b) and c), determining that the second switch is closed if the output voltage increases at a rate corresponding to a relation between the capacitance of the capacitor and a sum of the resistances of the first and second resistors;

between operations b) and c), determining that the second switched non-current limiting path is closed if the output voltage increases at a rate corresponding to a relation between the capacitance of the capacitor and the resistance of the first resistor;

between operations c) and d), detecting that the first switch is closed if the output voltage increases at the rate corresponding to a relation between the capacitance of the capacitor and the sum of the resistances of the first and second resistors; and between operations c) and d), detecting that the first switched non-current limiting path is closed if the output voltage increases at a rate corresponding to a relation between the capacitance of the capacitor and the resistance of the second resistor.

18. The method of claim 11, further comprising opening the first and second switched current-limiting paths after closing the first and second switched non-current-limiting paths.

19. The method of claim 11, further comprising:

verifying the output voltage after operation a) and before operation b);

executing operation b) in response to the output voltage measured after operation a) being less than an early restart voltage threshold; and closing the first and second switched non-current-limiting paths in response to the output voltage measured after operation a) being equal to or greater than the early restart voltage threshold.

20. The method of claim 11, further comprising:

receiving a shutdown command at the electric system; and opening of any one of the first switched non-current-limiting path, the second switched non-current-limiting path, the first switched current-limiting path, and the second switched current-limiting path that is closed at a time of receiving the shutdown command.

\* \* \* \* \*